US006822655B1

(12) United States Patent
Marion et al.

(10) Patent No.: US 6,822,655 B1
(45) Date of Patent: Nov. 23, 2004

(54) METHOD AND APPARATUS FOR CACHING VARIABLE SIZE PATTERNS INTO FIXED SIZE SLOTS

(75) Inventors: Neal Richard Marion, Georgetown, TX (US); George F. Ramsay, III, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 490 days.

(21) Appl. No.: 09/620,353

(22) Filed: Jul. 20, 2000

(51) Int. Cl.[7] .............................................. G06F 12/02

(52) U.S. Cl. ....................... 345/544; 345/537; 345/552; 345/557; 345/562; 711/153; 711/170

(58) Field of Search ................................ 345/557, 544, 345/552, 561, 562; 711/129, 153

(56) References Cited

U.S. PATENT DOCUMENTS

| | | | | | |
|---|---|---|---|---|---|
| 4,603,380 A | | 7/1986 | Easton et al. | ............... | 364/200 |
| 4,965,751 A | | 10/1990 | Thayer et al. | .............. | 364/521 |
| 4,994,962 A | * | 2/1991 | Mageau et al. | ................ | 711/3 |
| 5,357,605 A | * | 10/1994 | Rupel et al. | ................ | 345/545 |
| 5,454,076 A | * | 9/1995 | Cain et al. | .................. | 345/557 |
| 5,459,834 A | | 10/1995 | Katayama | ................... | 395/164 |
| 5,506,979 A | | 4/1996 | Menon | ....................... | 395/439 |
| 5,625,787 A | | 4/1997 | Mahin et al. | ............... | 395/380 |
| 5,802,557 A | | 9/1998 | Vishlitzky et al. | .......... | 711/112 |
| 5,991,847 A | * | 11/1999 | Ballard et al. | ................. | 711/3 |
| 6,035,387 A | | 3/2000 | Hsu et al. | ................... | 712/210 |
| 6,121,974 A | * | 9/2000 | Shaw | ......................... | 345/582 |
| 6,130,680 A | * | 10/2000 | Cox et al. | ................... | 345/544 |
| 6,370,619 B1 | * | 4/2002 | Ho et al. | .................... | 711/129 |
| 6,414,689 B1 | * | 7/2002 | Wu | ............................ | 345/558 |
| 6,430,656 B1 | * | 8/2002 | Arimilli et al. | ............. | 711/128 |

* cited by examiner

*Primary Examiner*—Matthew C. Bella
*Assistant Examiner*—Antonio Cashera
(74) *Attorney, Agent, or Firm*—Duke W. Yee; Mark E. McBurney

(57) ABSTRACT

A method and apparatus in a data processing system for processing a request to display a pattern. A plurality of partitions is created in a memory in a graphics adapter in the data processing system, wherein each partition within the plurality of partitions has a size equal to each of the other partitions within the plurality partitions. A determination is made as to whether the pattern is present within the plurality of partitions. The pattern is displayed using the plurality of partitions if the pattern is present within the plurality of partitions. The pattern is retrieved from another location if the pattern is absent from the plurality of partitions. Responsive to retrieving the pattern from another location, the pattern is stored if the pattern is within the size.

30 Claims, 5 Drawing Sheets

500

```
#define BASE_SLOT_ADDRESS      0x00000000
#define SIZE_OF_SLOT                      0x00015000
#define NUMBER_OF_SLOTS        25
typedef struct_slotstruct
{
   unsigned short      width;
   unsigned short      height;
   unsigned short      bitsPerPixel;
   unsigned int        MOUCount;
   Pointer             sourcePattern;
   Pointer             slotAddress;
} slotRec, *slotPtr;

slotRect               slot[NUMBER_OF_SLOTS];
for (i = 0; i < NUMBER_OF_SLOTS; i++)
{
   slot[i].width = 0;
   slot[i].height = 0;
   slot[i].bitsPerPixel = 0;
   slot[i].LOUCount = 0;
   slot[i].sourcePattern = 0;
   slot[i].slotAddress = BASE_SLOT_ADDRESS + (SIZE_OF_SLOT * i);
}                                                                  502
   if (pattern->width * pattern->height > SIZE_OF_SLOT)
      return(FALSE);  /* can not cache pattern */                  504

   if (slot[pattern->devprivate.slot].sourcePattern == pattern)
      return(slot);     /* the pattern in already cached */        506

   for (i = 0; i < NUMBER_OF_SLOTS; i++)
   {
      if (slot[i].sourcePattern)
      {
         freeSlot = i;
         break;
      }
   }

   pattern->devPrivate.slot = freeSlot;                            508

   louCount = MAX_LOU;
   for (i = 0; i <NUMBER_OF_SLOTS; i++)
   {
      if (slot[i].LOUCount < louCount)
      {
         louCount = slot[i].LOUCount;
         FreeSlot = i;
      }
   }

   pattern->devPrivate.slot = freeSlot;                            510
```

*FIG. 5A*

FIG. 5B

```
SetupHardwBltUnit(width, height, bitPerPixel);              } 512
WriteBltDataToHardare(pattern->data);

patternSize = pattern->width * pattern->height;                        } 514
if (SIZE_OF_SLOT / patternSize == 1)
   return;  /* we can not replicate the pattern in the slot */

maxReplicates = SIZE_OF_SLOT / (patW * patH);                          } 516
replicateHor = 1;
replicateVert = 1;

while(1)
{
   if (patW * replicateHor < patH * replicateVert)
   {
      if (((replicateHor + 1) * replicateVert) <= maxReplicates)
         replicateHor++;
      else
         break;
   }
   else
   {
      if (((replicateVert + 1) * replicateHor) <= maxReplicates)
         replicateVert++;
      else
         break;
   }

slot[freeSlot].width = pattern->width * replicateHor;
slot[freeSlot].height = pattern->height * replicateVert;

srcX = 0; srcY = 0; dstY = 0;                                          } 518
dstX = pattern->width;
for (i = 0; i < replicateHor; i++)
{
   DoHarewareScrToScrBlt(pattern->width, pattern->height, srcX, srcY, dstX, dstY);
   dstX += pattern->width;
}

srcX = 0; srcY = 0; dstX = 0;                                          } 520
dstY = pattern->height;
for (i = 0; i < replicateVert; i++)
{
   DoHarewareScrToScrBlt(slot[freeSlot].width, pattern->height, srcX, srcY, dstX, dstY);
   dstY += pattern->height;
}
```

METHOD AND APPARATUS FOR CACHING VARIABLE SIZE PATTERNS INTO FIXED SIZE SLOTS

BACKGROUND OF THE INVENTION

1. Technical Field

The present invention relates generally to an improved data processing system, and in particular to a method and apparatus for processing graphics data. Still more particularly, the present invention provides a method and apparatus for caching or storing graphics data in a manner to reduce bandwidth usage of a system bus.

2. Description of Related Art

Data processing systems, such as personal computers and work stations, are commonly utilized to run computer-aided design (CAD) applications, computer-aided manufacturing (CAM) applications, and computer-aided software engineering (CASE) tools. Engineers, scientists, technicians, and others employ these applications daily. These type of applications are normally graphics intensive in terms of the information relayed to the user. On these types of data processing systems, the graphics applications require priority access to system resources.

On the server side, however, the demand for fast graphics processing is less than that on the client side data processing systems. Instead, on a server data processing system, the emphasis is on the speed at which requests can be handled and processed. For example, a server may receive thousands of requests in an hour for web pages being hosted on the server. On server class data processing systems, a graphics display is used for system management and other low priority activities. The rendering used for these activities often requires the use of large patterned areas, such as, for example, window backgrounds and patterned buttons. Repeatedly sending a pattern from a memory or other storage across a bus to a graphics adapter for display uses a large portion of the system bus bandwidth. This usage reduces the availability of bus resources for higher priority applications, such as those used for responding to client requests.

Therefore, it would be advantageous to have an improved method and apparatus for handling graphics data in a manner in which the number of bus accesses are reduced.

SUMMARY OF THE INVENTION

The present invention provides a method and apparatus in a data processing system for processing a request to display a pattern. A plurality of partitions is created in a memory in a graphics adapter in the data processing system, wherein each partition within the plurality of partitions has a size equal to each of the other partitions within the plurality partitions. A determination is made as to whether the pattern is present within the plurality of partitions. The pattern is displayed using the plurality of partitions if the pattern is present within the plurality of partitions. The pattern is retrieved from another location if the pattern is absent from the plurality of partitions. Responsive to retrieving the pattern from another location, the pattern is stored if the pattern is within the size.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 5A and 5B are code for caching a pattern in accordance with a preferred embodiment of the present invention.

DETAILED DESCRIPTION OF THE PREFERRED EMBODIMENT

Figure 1:
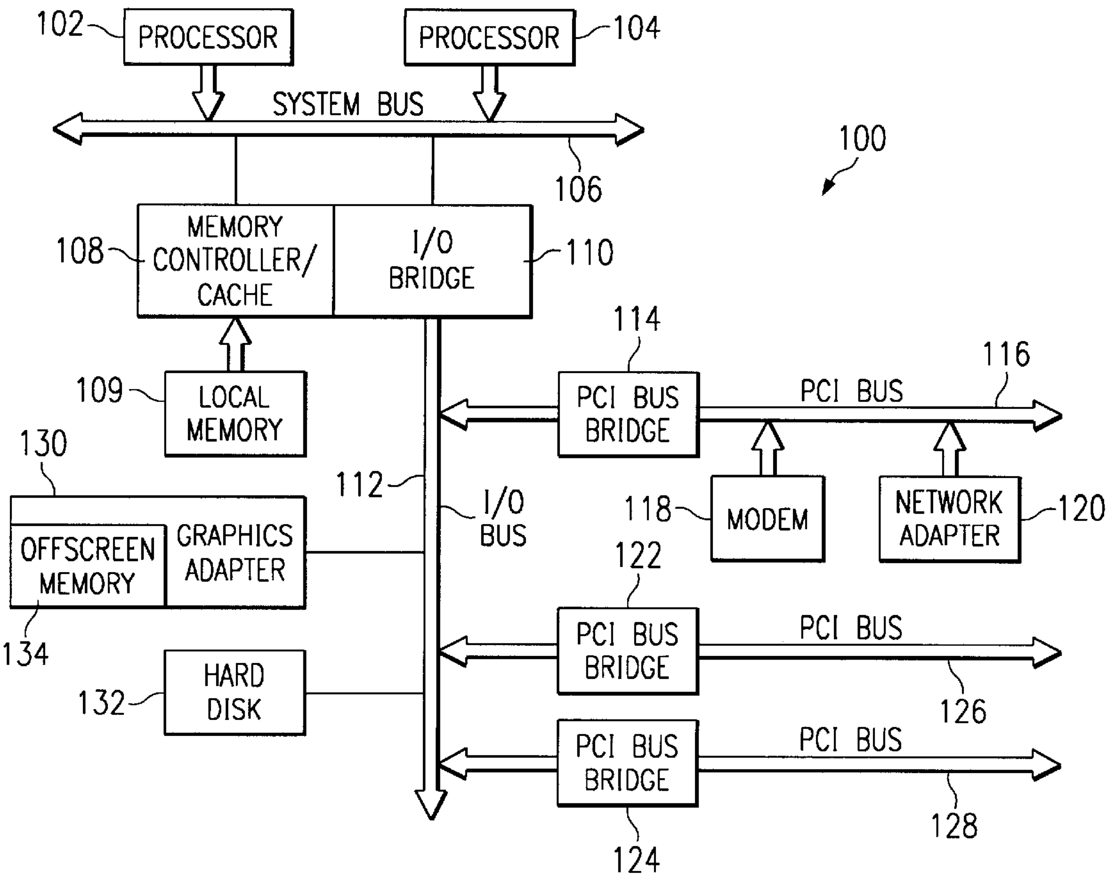
FIG. 1 is a block diagram of a data processing system that may be implemented as a server in accordance with a preferred embodiment of the present invention.

Referring to FIG. 1, a block diagram of a data processing system that may be implemented as a server is depicted in accordance with a preferred embodiment of the present invention. Data processing system 100 is an example of a server which the present invention may be implemented. Data processing system 100 in this example is a symmetric multiprocessor (SMP) system including a plurality of processors 102 and 104 connected to system bus 106. Alternatively, a single processor system may be employed. Also connected to system bus 106 is memory controller/cache 108, which provides an interface to local memory 109. I/O bus bridge 110 is connected to system bus 106 and provides an interface to I/O bus 112. Memory controller/cache 108 and I/O bus bridge 110 may be integrated as depicted.

Peripheral component interconnect (PCI) bus bridge 114 connected to I/O bus 112 provides an interface to PCI local bus 116. A number of modems may be connected to PCI bus 116. Typical PCI bus implementations will support four PCI expansion slots or add-in connectors. Communications links to client computers may be provided through modem 118 and network adapter 120 connected to PCI local bus 116 through add-in boards.

Additional PCI bus bridges 122 and 124 provide interfaces for additional PCI buses 126 and 128, from which additional modems or network adapters may be supported. In this manner, data processing system 100 allows connections to multiple network computers. A memory-mapped graphics adapter 130 and hard disk 132 may also be connected to I/O bus 112 as depicted, either directly or indirectly.

The mechanism of the present invention reduces the number of transfers from storage across bus resources to display graphics data on graphics adapter 130. In this example, graphics data may be located on local memory 109 or hard disk 132 for transfer across system bus 106 and I/O bus 112 to graphics adapter 130. This advantage is provided using a patterned caching mechanism to store frequently used patterns in offscreen memory 134 in graphics adapter 130. In these examples, the processes are implemented as instructions executed by a host processor or central processing unit, such as processor 102 or processor 104. Once a pattern is cached, the pattern may be rendered to the actual display using a bit block transfer function instead of sending the data across the bus. This bit block transfer function is used to transfer blocks of data. In these examples, the bit block transfer function is used to transfer data from offscreen memory into onscreen memory in the graphics adapter. In this manner, less bus bandwidth is required for graphics operations and the performance in displaying these patterns is increased.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention. For example, although a multiple bus system is illustrated, the present invention also may be implemented in a bus system with a single bus.

The data processing system depicted in FIG. 1 may be, for example, an IBM RISC/System 6000 system, a product of International Business Machines Corporation in Armonk, N.Y., running the Advanced Interactive Executive (AIX) operating system.

Figure 2:
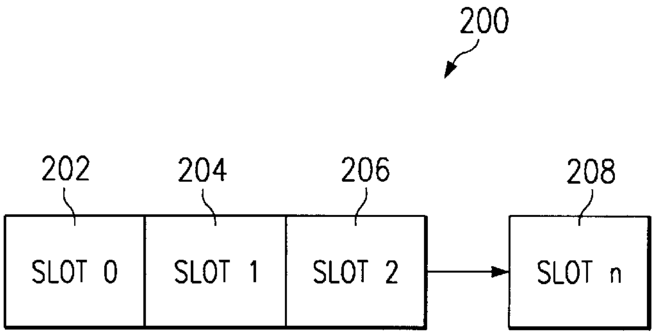
FIG. 2 is a diagram illustrating offscreen memory usage in accordance with a preferred embodiment of the present invention.

Turning next to FIG. 2, a diagram illustrating offscreen memory usage is depicted in accordance with a preferred embodiment of the present invention. In this example, offscreen memory 200 is partitioned into fixed sized buffers shown as slots 202–208. These slots are also referred to as "partitions". In these examples, slots 202–208 are all of equal size. The number of slots used depends on the amount of memory available and the particular implementation. Each slot is associated with the width of the pattern in the slot, the height of the pattern in the slot, the number of bits per pixel in the slot, a least often used (LOU) count, a pointer to the source pattern, and the memory address of the slot in the offscreen memory. This information is stored in a data structure, such as a table or a database for use by the processes of the present invention. The pointer is to the original pattern on the storage across the bus. The pointer also is used to determine whether a particular slot is in use.

Figure 3A:
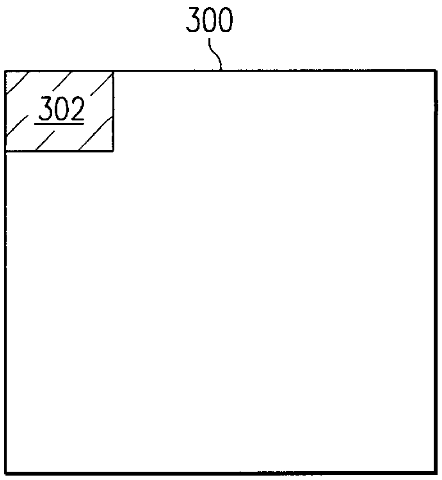
FIGS. 3A-3C are diagrams illustrating a pattern stored in a slot in accordance with a preferred embodiment of the present invention.
Figure 3B:
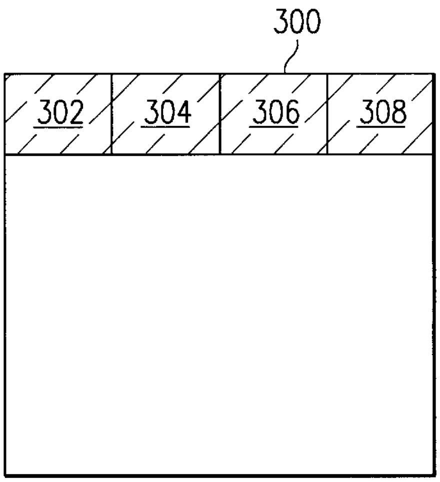
Figure 3C:
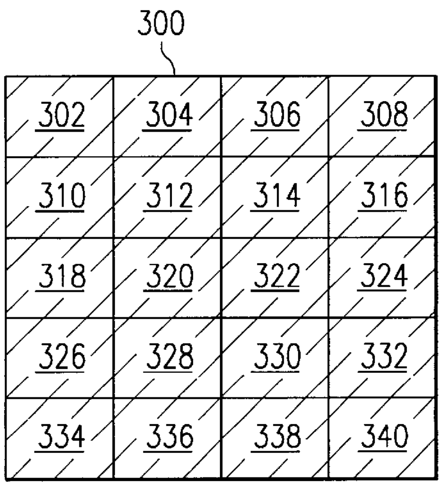

Turning next to FIGS. 3A-3C, diagrams illustrating a pattern stored in a slot is depicted in accordance with a preferred embodiment of the present invention. Additionally, the mechanism of the present invention stores the pattern in a manner to maximize later uses of the pattern. In FIG. 3A, slot 300 is a free slot in which pattern 302 is located. In this example, pattern 302 fits into slot 300 with additional space being available with slot 300. Additional copies 304–308 of pattern 302 is replicated in the horizontal direction as illustrated in FIG. 3B. These copies also are replicated in the vertical direction until the slot is filled up with copies 302–340 as shown in FIG. 3C. In some cases, the entire slot is not filled. The mechanism of the present invention places as many copies of a pattern as possible in the slot. When the pattern is to be used in a display, the entire group of replicated patterns are transferred in a single transfer function. This feature also increases the performance in displaying patterns in a display because the number of times a pattern is transferred is reduced through this replication feature.

Figure 4:
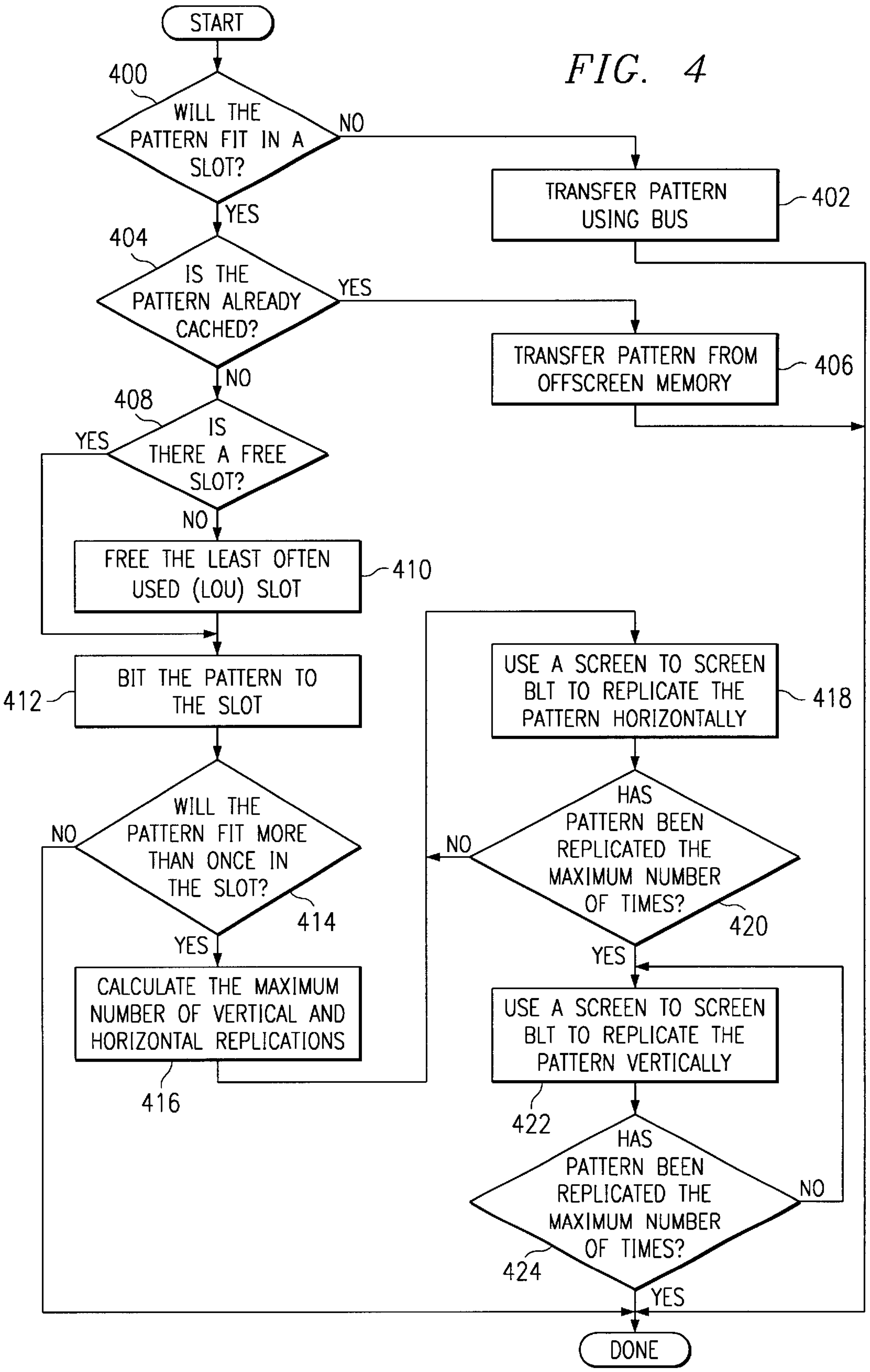
FIG. 4 is a flowchart of a process used for caching patterns in accordance with a preferred embodiment of the present invention.

With reference now to FIG. 4, a flowchart of a process used for caching patterns is depicted in accordance with a preferred embodiment of the present invention. In these examples, the process illustrated in FIG. 4 is implemented in a host processor.

This process is initiated in response to a request to display a pattern on a display device. A determination is made as to whether the pattern fits in a slot (step 400). If the pattern that is to be displayed is too large to fit in a slot, then the pattern will not be present within the slots in the graphics adapter. In this case, the pattern is displayed by transferring the pattern across the bus (step 402) with the process terminating thereafter.

Otherwise, a determination is made as to whether the pattern is already cached within a slot (step 404). If the pattern is already cached, then the pattern is displayed by transferring the pattern from the offscreen memory (step 406). If the pattern is not already cached, a determination is made as to whether a slot is free within the set of slots (step 408). If a slot is not free, then a slot is freed using a lease often used slot (step 410). of course, other mechanisms may be used for freeing up a slot. For example, a first-in-first-out (FIFO) process may be used to free a slot. Thereafter, a bit block transfer (blt) is used to transfer the pattern to the slot (step 412).

A determination is made as to whether the pattern will fit more than one time in the slot (step 414). If the pattern fits more than once in the slot, the maximum number of vertical and horizontal replications of the pattern is identified (step 416). A screen to screen bit block transfer is used to replicate the pattern horizontally (step 418). A bit block transfer is the process of replicating a block of data from one memory location into another memory location. A determination is made as to whether the pattern has been replicated the maximum number of times in the horizontal direction (step 420). If the pattern has not been replicated the maximum number of times, the process returns to step 418 as described above.

Otherwise, a screen to screen bit block transfer is used to replicate the pattern in the vertical direction (step 422). A determination is then made as to whether the pattern has been replicated the maximum number of times in the vertical direction (step 424). If the pattern has not been replicated the maximum number of times, the process returns to step 422. If the pattern has been replicated the maximum number of times, the process terminates.

Referring back to step 414, if the pattern will not fit more than once in the slot, the process terminates. Turning back to step 408, if a free slot is present, the process proceeds to step 412.

Turning next to FIGS. 5A and 5B, code for caching a pattern is depicted in accordance with a preferred embodiment of the present invention. Code 500 is an example implementation of steps in FIG. 4. In this example, code 500 is illustrated using the language C. Section 502 illustrates initialization of variables and memory for the caching mechanism. When a pattern is required for rendering, section 504 is used to determine if the pattern is small enough to fit in the slot. If the pattern is too large, then the pattern will not be cached. Section 506 is used to determine if the pattern is already cached. Section 508 is used to determine whether free slots are present within the set of slots initialized to store patterns.

Section 510 in code 500 is used to remove a LOU pattern and to free the slot. Section 512 is used to write a pattern into the slot in the offscreen memory. In section 514, code 500 determines whether the pattern will fit more than once into the slot. Section 516 is used to determine how many times the pattern can be replicated in both the horizontal and vertical directions in the slot. Next, section 518 is used to copy the pattern horizontally in the slot using a hardware screen to screen copy. Section 520 is used to copy the pattern vertically in the slot using a hardware screen to screen copy.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. Although the illustrated examples implement the process for use by a host processor or a CPU, these pattern caching processes also may be implemented in other places. For example, the pattern caching processes may be implemented in graphics adapter 130. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for processing a request to display a graphical pattern, the method comprising:

creating a plurality of partitions in a memory in a graphics adapter in the data processing system, wherein each partition within the plurality of partitions has a size equal to each of the other partitions within the plurality partitions;

responsive to a request to display the graphical pattern; determining whether the graphical pattern is present within the plurality of partitions;

displaying the graphical pattern using the plurality of partitions if the graphical pattern is present within the plurality of partitions;

retrieving the graphical pattern from another location across a bus to the graphics adapter if the graphical pattern is absent from the plurality of partitions;

responsive to retrieving the graphical pattern from another location, storing the graphical pattern in a partition within the plurality of partitions to form a stored graphical pattern if the graphical pattern is within the size;

responsive to storing the graphical pattern in the partition, placing a copy of the stored graphical pattern within the partition with the stored graphical pattern if the copy fits within the partition along with any other copies of the stored graphical pattern; and repeating the placing step for additional copies of the stored graphical pattern as long as each additional copy fits within the partition, wherein all of the graphical patterns in the partition may be transferred in a single operation.

2. The method of claim 1 further comprising wherein the storing step is performed only if a free partition is available in the plurality of partitions.

3. The method of claim 1 further comprising:

selectively freeing up an occupied partition within the plurality of partitions if an empty partition is absent within the plurality of partitions to form a free partition; and storing the graphical pattern in the free partition.

4. A method in a data processing system for processing a request to display a pattern, the method comprising:

creating a plurality of partitions in a memory in a graphics adapter in the data processing system, wherein each partition within the plurality of partitions has a size equal to each of the other partitions within the plurality partitions;

responsive to a request to display the pattern; determining whether the pattern is present within the plurality of partitions;

displaying the pattern using the plurality of partitions if the pattern is present within the plurality of partitions;

retrieving the pattern from another location if the pattern is absent from the plurality of partitions; and responsive to retrieving the pattern from another location, storing the pattern if the pattern is within the size, wherein the storing step includes:

determining a number of times in which the pattern can be stored within one partition within the plurality of partitions; and storing the requested pattern the number of times within the slot, wherein a number of times that the requested pattern is transferred is reduced when more than one copy of the requested pattern is stored in the slot.

5. A method in a data processing system for processing graphics data, the method comprising:

receiving a request to use a requested graphics pattern;

determining whether the requested graphics pattern is present in a plurality of slots, wherein each of the plurality of slots has a size equal to all other slots within the plurality of slots, wherein graphics patterns stored within the plurality of slots have different sizes;

responsive to an absence of the requested graphics pattern, determining whether the requested graphics pattern has a size that fits within the plurality of slots; and storing the requested graphics pattern in a slot within the plurality of slots if the requested graphics pattern fits within the slot, wherein graphics patterns stored within the plurality of slots have different sizes, wherein a number of times that the requested graphics pattern is transferred is reduced when more than one copy of the requested graphics pattern is stored in the slot.

6. The method of claim 5 further comprising:

responsive to a presence of the requested graphics pattern in the plurality of slots, using the requested graphics pattern in the plurality of slots.

7. The method of claim 5 further comprising:

selectively freeing up an occupied slot within the plurality of slots if an empty slot is absent within the plurality of slots to form a free slot; and storing the requested graphics pattern in the free slot.

8. The method of claim 5, wherein the step of selectively freeing up an occupied slot is performed using a least often used algorithm.

9. The method of claim 5, wherein the step of selectively freeing up an occupied slot is performed using a first-in-first-out algorithm.

10. The method of claim 5, wherein the receiving, determining, and storing steps are performed by a central processing unit in the data processing system.

11. The method of claim 5, wherein the receiving, determining, and storing steps are performed by a processor in a graphics adapter in the data processing system.

12. A method in a data processing system for processing graphics data, the method comprising:

receiving a request to use a requested graphics pattern;

determining whether the requested graphics pattern is present in a plurality of slots, wherein each of the plurality of slots has a size equal to all other slots within the plurality of slots; and responsive to an absence of the requested graphics pattern, storing the requested graphics pattern in a slot within the plurality of slots if the graphics pattern fits within the slot, wherein the storing step comprises:

determining a number of times in which the requested graphics pattern can be stored within one slot; and storing the requested pattern the number of times within the slot, wherein a number of times that the requested pattern is transferred is reduced when more than one copy of the requested pattern is stored in the slot.

13. A data processing system comprising:

a bus system;

a first memory connected to the bus system, wherein the memory holds a set of instructions;

a graphics unit connected to the bus system, wherein the graphics unit includes a second memory and generates signals to display data on a display device; and a processing unit connected to the bus system, wherein the processing unit executes the set of instructions to create a plurality of partitions in a memory in a graphics adapter in the data processing system in which each partition within the plurality of partitions has a size equal to each of the other partitions within the plurality partitions, determine whether a graphical pattern is present within the plurality of partitions in response to a request to display the graphical pattern, display the graphical pattern using the plurality of partitions if the graphical pattern is present within the plurality of partitions, retrieve the graphical pattern from another location across a bus to the graphics adapter if the graphical pattern is absent from the plurality of partitions, store the graphical pattern in a partition within the plurality of partitions to form a stored graphical pattern if the graphical pattern within the size in response to retrieving the graphical pattern from another location, place a copy of the stored graphical pattern within the partition with the stored graphical pattern if the copy fits within the partition along with any other copies of the stored graphical pattern in response to storing the graphical pattern in the partition; and repeat the instructions to place for additional copies of the stored graphical pattern as long as each additional copy fits within the partition, wherein all of the graphical patterns in the partition may be transferred in a single operation.

14. The data processing system of claim 13, wherein the bus system is a single bus.

15. The data processing system of claim 13, wherein the bus system includes a primary bus and a secondary bus.

16. The data processing system of claim 13, wherein the processing unit includes a plurality of processors.

17. A data processing system for processing a request to display a graphical pattern, the data processing system comprising:

creating means for creating a plurality of partitions in a memory in a graphics adapter in the data processing system, wherein each partition within the plurality of partitions has a size equal to each of the other partitions within the plurality of partitions;

determining means, responsive to a request to display a graphical pattern, for determining whether the graphical pattern is present within the plurality of partitions;

displaying means for displaying the graphical pattern using the plurality of partitions if the graphical pattern is present within the plurality of partitions;

retrieving means for retrieving the graphical pattern from another location across a bus to the graphics adapter if the graphical pattern is absent from the plurality of partitions;

storing means, responsive to retrieving the graphical pattern from another location, for storing the graphical pattern in a partition within the plurality of partitions to form a stored graphical pattern if the graphical pattern is within the size;

placing means, responsive to storing the graphical pattern in the partition, placing a copy of the stored graphical pattern within the partition with the stored graphical pattern if the copy fits within the partition along with any other copies of the stored graphical pattern; and repeating means for repeating initiation of the placing means for additional copies of the stored graphical pattern as long as each additional copy fits within the partition, wherein all of the graphical patterns in the partition may be transferred in a single operation.

18. The data processing system of claim 17 further comprising wherein the storing step is performed only if a free partition is available in the plurality of partitions.

19. The data processing system of claim 17 further comprising:

selectively freeing means for selectively freeing up an occupied partition within the plurality of partitions if an empty partition is absent within the plurality of partitions to form a free partition; and storing means for storing the graphical pattern in the free partition.

20. A data processing system for processing a request to display a pattern, the data processing system comprising:

creating means for creating a plurality of partitions in a memory in a graphics adapter in the data processing system, wherein each partition within the plurality of partitions has a size equal to each of the other partitions within the plurality of partitions;

determining means, responsive to a request to display the pattern, for determining whether the pattern is present within the plurality of partitions;

displaying means for displaying the pattern using the plurality of partitions if the pattern is present within the plurality of partitions;

retrieving means for retrieving the pattern from another location if the pattern is absent from the plurality of partitions; and determining means, responsive to retrieving the pattern from another location, for storing the pattern if the pattern is within the size, wherein the storing step comprises:

determining means for determining a number of times in which the pattern can be stored within one partition within the plurality of partitions; and storing means for storing the requested pattern the number of times within the slot, wherein a number of times that the requested pattern is transferred is reduced when more than one copy of the requested pattern is stored in the slot.

21. A data processing system for processing graphics data, the data processing system comprising:

receiving means for receiving a request to use a requested graphics pattern;

determining means for determining whether the requested graphics pattern is present in a plurality of slots, wherein each of the plurality of slots has a size equal to all other slots within the plurality of slots, wherein graphics patterns stored within the plurality of slots have different sizes;

determining means, responsive to an absence of the requested graphics pattern, for determining whether the requested graphics pattern has a size that fits within the plurality of slots, wherein graphics patterns stored within the plurality of slots have different sizes; and, storing means for storing the requested graphics pattern in a slot within the plurality of slots if the requested graphics pattern fits within the slot, wherein graphics patterns stored within the plurality of slots have different sizes, wherein a number of times that the requested graphics pattern is transferred is reduced when more than one copy of the requested graphics pattern is stored in the slot.

22. The data processing system of claim 21 further comprising:

determining means, responsive to a presence of the requested graphics pattern in the plurality of slots, for using the requested graphics pattern in the plurality of slots.

23. The data processing system of claim 21 further comprising:

selectively freeing means for selectively freeing up an occupied slot within the plurality of slots if an empty slot is absent within the plurality of slots to form a free slot; and storing means for storing the requested graphics pattern in the free slot.

24. The data processing system of claim 21, wherein the means of selectively freeing up an occupied slot is located using at least often used algorithm.

25. The data processing system of claim 21, wherein the means of selectively freeing up an occupied slot is located using a first-in-first-out algorithm.

26. The data processing system of claim 21, wherein the receiving, determining, and storing means are located by a central processing unit in the data processing system.

27. The data processing system of claim 21, wherein the receiving, determining, and storing means are located by a processor in a graphics adapter in the data processing system.

28. A data processing system for processing graphics data, the data processing system comprising:

receiving means for receiving a request to use a requested graphics pattern;

determining means for determining whether the requested graphics pattern is present in a plurality of slots, wherein each of the plurality of slots has a size equal to all other slots within the plurality of slots; and determining means, responsive to an absence of the requested graphics pattern, for storing the requested graphics pattern in a slot within the plurality of slots if the graphics pattern fits within the slot, wherein the storing step comprises:

determining means for determining a number of times in which the requested graphics pattern can be stored within one slot; and storing means for storing the requested pattern the number of times within the slot, wherein a number of times that the requested pattern is transferred is reduced when more that one copy of the requested pattern is stored in the slot.

29. A computer program product in a computer readable medium for use in a data processing system for processing a request to display a graphical pattern, the computer program product comprising:

first instructions for creating a plurality of partitions in a memory in a graphics adapter in the data processing system, wherein each partition within the plurality of partitions has a size equal to each of the other partitions within the plurality partitions;

second instructions, responsive to a request to display a graphical pattern, for determining whether the graphical pattern is present within the plurality of partitions;

third instructions for displaying the graphical pattern using the plurality of partitions if the graphical pattern is present within the plurality of partitions;

fourth instructions for retrieving the graphical pattern from another location across a bus to the graphics adapter if the graphical pattern is absent from the plurality of partitions;

fifth instructions, responsive to retrieving the graphical pattern from another location, for storing the graphical pattern in a partition within the plurality of partitions to form a stored graphical pattern if the graphical pattern is within the size;

sixth instructions, responsive to storing the graphical pattern in the partition, for placing a copy of the stored graphical pattern within the partition with the stored graphical pattern if the copy fits within the partition along with any other copies of the stored graphical pattern; and seventh instructions for repeating execution of the sixth instructions for additional copies of the stored graphical pattern as long as each additional copy fits within the partition, wherein all of the graphical patterns in the partition may be transferred in a single operation.

30. A computer program product in a computer readable medium for use in a data processing system for processing graphics data, the computer program product comprising:

first instructions for receiving a request to a requested graphics pattern;

second instructions for determining whether the requested graphics pattern is present in a plurality of slots, wherein each of the plurality of slots has a size equal to all other slots within the plurality of slots;

third instructions, responsive to an absence of the requested graphics pattern, for determining whether the requested graphics pattern has a size that fits within the plurality of slots; and fourth instructions for storing the requested graphics pattern in a slot within the plurality of slots if the requested graphics pattern fits within the slot, wherein graphics patterns stored within the plurality of slots have different sizes, wherein a number of times that the requested graphics pattern is transferred is reduced when more than one copy of the requested graphics pattern is stored in the slot.

* * * * *